Sept. 22, 1964  C. F. SEIBERT. JR  3,149,427
TOP-LIFTS FOR SHOE HEELS
Filed May 9, 1963
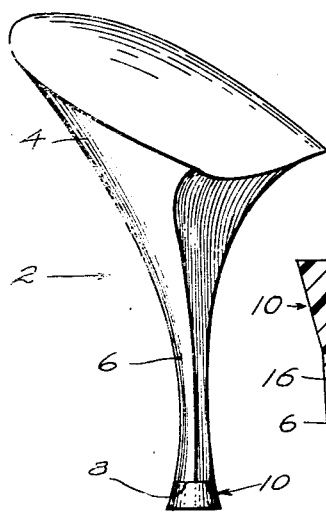
FIG. 1
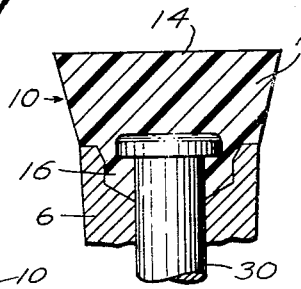
FIG. 3
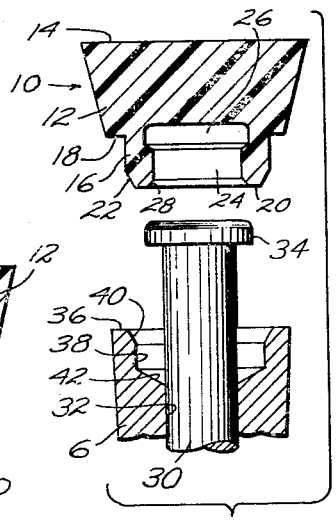
FIG. 2
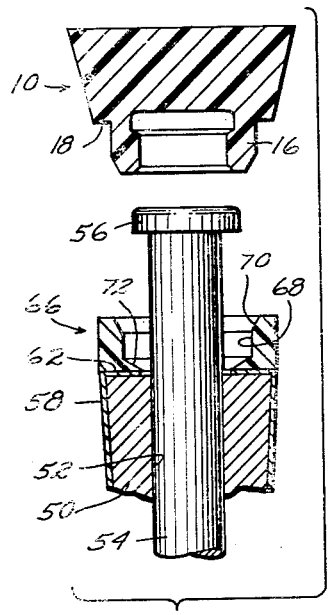
FIG. 4
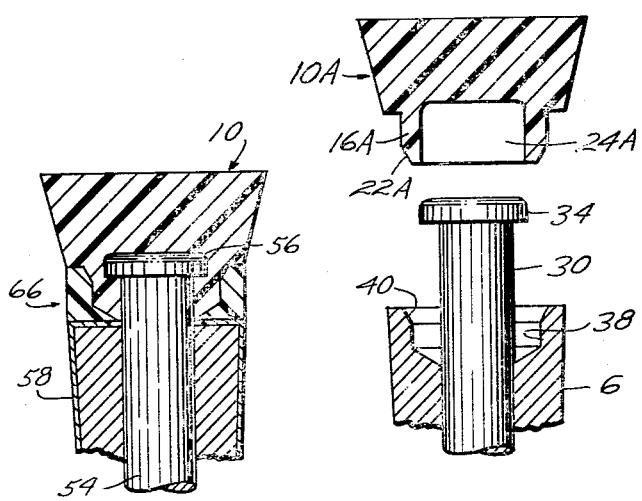
FIG. 5
FIG. 6
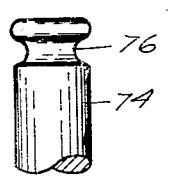
FIG. 7
INVENTOR.
CARL F. SEIBERT JR.
BY
Weingarten, Ozenbuch & Pardiscio
ATTORNEYS

United States Patent Office 3,149,427
Patented Sept. 22, 1964

3,149,427
TOP-LIFTS FOR SHOE HEELS
Carl F. Seibert, Jr., Springvale, Maine, assignor to Eastern Plastics Corporation, Sanford, Maine
Filed May 9, 1963, Ser. No. 279,141
17 Claims. (Cl. 36—34)

This invention relates to shoe heels and more particularly to improvements in top-lifts for the heels of women's shoes.

In recent years heel manufacturers have turned to making the heels of women's shoes, particularly spike heels, out of plastic because improvements in materials, molding techniques and equipment have made it possible to fabricate plastic heels in a wide variety of styles, sizes and colors at relatively low cost. Perhaps the most significant aspect of this advance in the art has been the introduction of high style spike heels having shanks which taper down to extremely narrow tread ends. While these very narrow spike heels have gained wide acceptance, their manufacture has not been without problems. For one thing, with the plastics which satisfy cost and molding requirements the narrow shanks have a tendency to break under the loads which spike heels must support. For this reason it has been found necessary to reinforce them by a metal core, most conveniently in the form of a dowel or nail driven into the tread end. A second problem with plastic heels has been to provide a suitable means of attaching top-lifts, i.e. taps, to their tread ends. Tacking or cementing is unsatisfactory for a variety of reasons, particularly where the tread end has a diameter or side dimension in the order of ½" or less. Heretofore this second problem has been solved by molding the top-lifts onto the ends of the dowels or nails before they are inserted in the heels. The most common approach has been to use nails with enlarged and/or regular or specially shaped heads which provide an anchor for the plastic top-lifts in which they are embedded. The tread ends of the heels are provided with bores of suitable size to facilitate installation of the nails and assure that the top-lifts will be in correct registration. While this mode of applying top-lifts is widely used, it is subject to certain limitations. For one thing, the strength of the mechanical connection between the nail head and the top-lift is subject to variation by the manner in which the top-lift is molded. Slight mold defects and insufficient molding pressure will affect the connection. Also affecting the connection is the manner in which the nail is driven into the heel. If the nail is driven in too far, the tread end of the heel will exert an outward force on the top-lift, urging it away from the nail head. Another limitation is extent of useful life. Relative to this point it is to be noted that a certain minimum thickness of top-lift material is required on the heel side of the nail head in order to get a good mechanical connection. On the other hand, for aesthetic reasons a top-lift must have a thickness which is compatible with the overall size and shape of the heel. Too thick a top-lift detracts from the appearance of the heel. Accordingly, in some styles the thickness of the top-lift material available for wear is relatively small, causing the lift to have a short life. Once the lift is worn down to the nail head, it must be replaced to avoid damage to floors and rugs by the nail head. Still another limitation is inventory. Different heels not only may require different lifts but also different length nails. Hence the heel or shoe manufacturer is required to stock lifts according to nail size as well as lift size and style.

Accordingly, the primary object of the present invention is to provide improvements in the manufacture of plastic top-lifts which eliminate the problems attendant to the current practice of molding top-lifts directly on the heads of reinforcing nails or dowels.

A more specific object of the present invention is to provide a novel top-lift construction which is economical to manufacture, strong, long wearing, and attractive, and permits a reduction in the inventory required for a wide line of heel styles and sizes. Top-lifts constructed according to the present invention are designed for use with nails (or dowels) and each lift is characterized by a neck portion which is squeezed between a nail and a surrounding portion of the heel in which the nail is embedded. The radial compression exerted on its neck portion causes the lift to be anchored to the nail in a very strong connection. Since the nail head can be flush with or project only slightly from the tread end of the heel, substantially all of the visible portion of the lift is available for wear.

Other objects and many of the attendant advantages of the invention will be readily apparent from the following detailed specification when considered together with the accompanying drawings wherein:

FIG. 1 is a perspective view of the heel of a woman's shoe provided with a top-lift embodying the present invention;

FIG. 2 relates to a preferred form of the invention and is an exploded vertical sectional view of the bottom end of the heel of FIG. 1 with the latter mounted upside down in lift-applying position;

FIG. 3 is a vertical sectional view showing the component parts of FIG. 2 in their normal assembled position;

FIG. 4 is a view similar to FIG. 2 of a modified form of the invention;

FIG. 5 shows the component parts of FIG. 4 in their normal assembled position;

FIG. 6 is a view similar to FIG. 2 of still another form of the invention; and

FIG. 7 is a fragmentary view of another form of nail useable with the present invention.

Turning now to FIG. 1, there is shown a plastic heel 2 having a broad top heel-seating portion 4 formed integral with a shank portion 6 which tapers down to a narrow tread end 8 to which is attached a plastic top-lift 10. The exposed portion of the latter is shaped to complement the heel so as to provide a unified attractive design. According to the preferred form of the invention shown in FIGS. 2 and 3, the top-lift 10 is molded as a separate piece and subsequently is applied to a nail which is driven into the heel of a shoe.

The top-lift 10 is molded of a suitable plastic which is tough yet has some resiliency and comprises a frusto-conical body portion 12 having a relatively flat walking surface 14 at its bottom end and an annular neck portion 16 projecting from its top end. It is to be noted that the terms "bottom end" and "top end" are based upon the orientation of the top-lift when supporting a heel (FIG. 1 position).

Neck portion 16 is of smaller diameter than the body portion 12, resulting in an annular shoulder 18 disposed in a plane parallel to the surface 14. The upper end of neck portion 16 terminates in a flat end surface 20 which is bevelled at its outer edge as shown at 22. Formed in the neck portion is an open cavity 24 which extends inwardly from end surface 20 to a point substantially on a level with annular shoulder 18. The inner end of cavity 24 is enlarged as shown at 26. The inner edge of end surface 20 also is bevelled, as shown at 28.

The cavity 24 is provided to permit the top-lift to be slipped onto a nail 30 whereby it is secured to the heel 2. The nail 30 is sized to be driven into a bore 32 formed in heel 2. Although not shown, it is to be understood that the bore 32 extends from the tread end of the heel up to a point short of the top of its broad portion 4. The nail has a head 34 which is disposed in the enlarged portion 26 of cavity 24 when the top-lift is mounted on the nail.

The diameters of cavity 24 and its enlarged portion 26 depend upon the corresponding diameters of the nail and its head. The enlarged portion 26 has a diameter substantially the same as that of the nail head. However, the remainder of cavity 24 has a diameter less than the nail head but slightly larger than the nail shank. With this arrangement, the top-lift can be snapped into the nail by hand or with a suitable tool.

The outside dimensions of neck portion 16 of the top-lift depend upon the heel to which the lift is attached. The tread end of the heel has a flat end surface 36 with a counterbore 38 for the bore 32. The inner edge of end surface 36 is bevelled as shown at 40 to provide a countersink for bore 38. The inner end of the counterbore tapers inwardly as shown at 42. The axial dimension from the inner edge of taper 42 to the end surface 36 is slightly greater than that of neck portion 16. Counterbore 38 has a diameter which is slightly less than the outside diameter of neck portion 16 of the top-lift. The largest diameter of countersink 40 is slightly larger than the outer diameter of neck portion 16. The outer diameter of the tread end of the heel is about the same as the outer diameter of the annular shoulder 18.

The top-lift, nail and heel may be assembled in one of two ways. According to one way the nail is driven in part way, e.g. to the depth shown in FIG. 2, then the top-lift is snapped over the nail head. Finally the top-lift and nail are driven to the position shown in FIG. 3. The second way is to snap the top-lift onto the nail head and then drive the nail into the heel to the same final position. In both cases the top-lift will be securely anchored to the heel. The strong connection which results is due to the fact that the neck portion 16 is oversize in relation to the counterbore 38. Hence when the neck portion is driven into the counterbore, it is compressed radially inward so as to make a tight grip with the nail shank and the side and underside of the nail head. Contributing to this tight grip is the compression of the neck portion resulting from the fact that the counterbore in the heel is shorter than the neck portion. When the neck portion is driven into the heel, the taper 42 directs the end of the neck portion inwardly toward the nail and up against the underside of the nail head, the neck portion being deformed to fully fill the space between the nail and surrounding portion of the heel. The top-lift cannot come off and any attempt to pull it off will succeed to the extent of rupturing it at the level of shoulder 18. In this connection it is to be observed that having the cavity 24 extend to slightly beyond the level of shoulder 18 facilitates removal of the top-lift and nail by a pair of pliers having inwardly extending jaws which can be inserted between shoulder 18 and end surface 36 into contact with the nail head 34.

Although the embodiment of FIGS. 2 and 3 is predicated upon the top-lift being molded separately from the nail, it is not necessary to do so. Instead the top-lift can be molded directly on the nail. This alternative approach requires no material change in the construction of the top-lift. The oversize relation of the neck portion 16 to the counter bore in the shoe heel will still hold true, so that when the nail is driven into the heel the neck portion will undergo compression inwardly against the nail. With this alternate approach the degree of attachment between the top-lift and the nail head prior to insertion in the shoe heel is not critical and may even be so little as to permit the top-lift to be pulled off from the nail by hand. Nevertheless the same firm connection will result on final assembly due to the radial compression phenomenon previously described.

The present invention is also applicable to heels which have a covering of leather or other covering material. FIGS. 4 and 5 illustrate how this is accomplished. In these figures the tapered tread end of a heel shank 50 has an internal bore 52 into which may be driven a nail 54 having a head 56. The exterior surface of the heel has a leather covering 58 which is folded over onto the flat end surface of the heel as shown at 62. Sized to sit onto the end of the heel is a cylindrical adaptor 66 which preferably is molded of a rigid material having a finish similar to the top-lift. The top and bottom sides of the adaptor are flat and it has a central bore 68 which conforms to the counterbore 38 shown in FIG. 2. Additionally the adaptor has a countersink 70 conforming to the countersink 40 of FIG. 2. The bottom end of the bore 68 terminates in a taper 72 which conforms to the taper 42 of FIG. 2. The adaptor 66 may be adhesively secured to the folded-over portion 62 of the leather covering. Alternatively the adaptor 66 may be loose relative to the heel prior to application of the top-light. The embodiment of FIGS. 4 and 5 can use the top-lift 10 of FIGS. 1 to 3.

Preferably the component parts shown in FIG. 4 are assembled in the following manner.

First of all the nail 54 is slipped through the adaptor 66 and driven part way into the heel. Thereafter the top-lift 10 is snapped over the head 56 of the nail. Then by application of force to the walking surface end of the top-lift the nail is driven into the heel of the shoe to the depth shown in FIG. 5. When the nail is driven into the heel the neck portion 16 of the top-lift enters the bore 68 and shoulder 18 forces the adaptor tight against the end of the heel. The neck 16 is distorted by radial compression in the manner previously described in connection with FIGS. 2 and 3, causing the top-lift to be locked between nail 54 and adaptor 66. The top-lift can be removed only by rupturing it along a line even with the shoulder 18 or by extracting the nail with pliers as previously described.

It is to be observed that the adaptor need not be cylindrical as shown but may have a polygonal shape or be frusto-conical so as to function as a continuation of the exterior exposed surface of the top-lift. It is to be appreciated also that the adaptor may be made of the same or a different material and also have the same or a different color as the heel or top-lift. The adaptor may even be made of metal.

FIG. 6 illustrates still another form of the invention. In this case the heel and the nail are as shown in FIG. 2 but the top-lift 10A is slightly different. It differs from the top-lift 10 shown in FIG. 2 in that its internal cavity 24A is of constant diameter, lacking both an enlarged portion for the head of the nail and a bevelled entry as provided by the bevel 28 shown in FIG. 2. Nevertheless the top-lift 10A will become securely attached to the heel when driven into place in the manner described previously in connection with FIGS. 2 and 3. As the oversized neck portion is forced into the heel it will be deformed so as to fully occupy the space between the surrounding portion of the heel and the nail 30. The portion of the neck 16A which is deformed into position behind the nail head will act to anchor the top-lift to the nail so that the lift cannot be pulled off the nail without rupturing.

While the top-lifts 10 of FIG. 2 and 10A of FIG. 6 are provided with bevels 22 and 22A respectively for facilitating entry of the neck portions into the counterbores 38, it is not necessary to have them and they may be omitted without affecting the secure connection between the top-lift and the nail. In this connection it is to be appreciated that the countersinks 40 act to lead or guide the neck portions into the counterbores 38 so that omission of the bevels 22 and 22A does not prevent the neck portions from being readily centered relative to the heel. These countersinks may be omitted if the bevelled portions 22 and 22A are retained.

Although the nails shown in FIGS. 2 to 6 have enlarged heads, this is not necessary. Instead it is possible to use a nail 74 (FIG. 7) that has a substantially constant diameter except for a groove 76 at the end to which the top-lift is to be applied. Although this type of nail can be used with the top-lift shown in FIGS. 2 and 3, provided that the inside dimensions of the cavity 24 are sized so that the top-lift will make a good grip with the nail when subjected to radial compression, it is preferred to use the top-lift 10A shown in FIG. 6 with the cavity 24A having an inside diameter which is substantially the same as the outside diameter of the nail. However the outside diameter of the neck portion 16A will still be larger than the counterbore 38. Therefore when the nail 74 is driven into the heel with top-lift 10A attached, the neck portion 16A will be forced inwardly by the counterbore 38, causing the neck portion to fully fill the groove 76. The material which is forced into and fills groove 76 functions to mechanically lock the top-lift to the nail. The resulting construction is sturdy with the top-lift being as fully secure as with the other embodiments hereinabove described. If desired, more than one groove may be provided in the nail or the groove may be made spiral instead of circular. Alternatively the grooves may be replaced by one or more depressions swaged into the nail.

It is to be appreciated further that the embodiments of FIGS. 5 and 6, using either the nails shown therein or the nail shown in FIG. 7, may be made with the top-lift molded in situ on the nail in the manner described above in connection with the embodiment of FIGS. 2 and 3. When molded in place on the nail the top-lift may be held thereon by a relatively tight fit or may be capable of being pulled out by hand. Nevertheless when the elements are assembled in the manner previously described the top-lift will be held securely in place.

Heretofore it has been deemed necessary to use nails having flutes or ribs running along their shanks in order to achieve a friction fit sufficiently firm to resist axial and rotational movement during normal use. With the present invention this need is eliminated since the friction fit normally derived by driving a nail into a heel is supplemented by the friction which results when the neck portion of the top-lift is squeezed between the nail and the surrounding heel. Notwithstanding the fact that fluted nails are not required with this invention, they may still be used if it is desired to do so.

It is believed to be apparent from the foregoing description and the accompanying illustrations that the neck portions of the top-lifts are concealed within the heels to which they are attached. Hence, the outward appearance of the top-lift is substantially the same as is achieved with constructions of the prior art, as, for example, the construction shown in the U.S. Patents No. 3,050,877. However, since the nail head is substantially flush with the end of the heel instead of projecting below the end of the heel, making the top-lifts with their exterior side surfaces substantially the same height as top-lifts made according to the prior art affords the advantage that much more material is available for wear than is possible with the prior art constructions. Additionally the connection made between the top-lift and the heel is believed to be much stronger than is possible with prior art construction since a substantial amount of top-lift material surrounds the nail and is trapped between the nail and the heel. This substantial amount of top-lift material is capable of withstanding considerable stress without rupture. Since the neck portion of the top-lift is primarily responsible for the secure connection, it is possible for the nail head to be fully recessed within the heel or the adaptor 66. While this deeper setting of the nail complicates removal even when using pliers or grippers, it offers the advantage of leaving still more of the top-lift available for wear. Moreover when the top-lift is worn down to the level of the end surface of the heel or of the adaptor, the nail head still will not be exposed and therefore can not do damage to floors and rugs.

The advantage of longer life attainable with applicant's construction due to more material available for wear is believed to be readily apparent from the fact that a top-lift constructed according to the present invention having an exposed height of 3/16" provides as much wear surface as a conventional 5/16" lift constructed according to the prior art as, for example, U.S. Patent No. 3,050,877.

Another advantage of this invention is that slight variations in top-lift dimensions will not prevent attainment of a secure connection. Hence occurrence of slight mold imperfections may not necessarily prevent production of satisfactory top-lifts. On the other hand, since the top-lifts can be molded separately from the nails used to anchor them, there is the further advantage that they can be injection molded at very high rates and to very close tolerances.

Although various plastics may be used, the top-lift material must be an elastomer at some temperature at which it can be assembled. This is essential in order for the neck portion of the top-lift to flow under radial compression so as to achieve the locking connection hereinabove described. By way of example but not of limitation, among the materials which are suitable for the present invention are plastics of the polyurethane and polyvinylchloride classes. Still other plastics well known to persons skilled in the art may be employed with satisfactory results.

Notwithstanding the fact that the invention has been described using nails as the means for anchoring the top-lifts, it is to be understood that the invention is not limited to nails but may utilize screws or other kinds of dowel-type elements. Accordingly as used herein the term dowel should be construed as including nails, screws and similar forms of elongated reinforcing means.

Obviously many modifications and variations of the present invention are possible in view of the above teachings. It is to be understood, therefore, that the invention is not limited in its application to the details and arrangements specifically described or illustrated, and that within the scope of the appended claims, it may be practiced otherwise than as specifically described or illustrated.

What is claimed is:

1. A heel having a relatively large top portion and a shank formed integral therewith which terminates with a relatively narrow tread end, said shank having an elongated hole extending longitudinally thereof from said tread end toward said top portion, means at said tread end defining a counterbore for said hole, a reinforcing dowel driven into said hole, and a plastic top-lift having a body portion with a bottom walking surface and a neck portion formed integral with and projecting up from said body portion, said neck portion having a cavity with the bottom end of said dowel disposed therein, said neck portion inserted into said counterbore, said neck prior to insertion having an outside diameter larger than the diameter of said counterbore, said neck portion in inserted position being deformed inwardly against said dowel by radial compression exerted by said heel at the level of said counterbore, whereby said top-lift is frictionally secured to said heel.

2. A heel as defined by claim 1 wherein said counterbore is formed in said shank.

3. A heel as defined by claim 1 wherein said counterbore is formed in a separate adaptor disposed between said tread end and a shoulder on said body portion.

4. A heel as defined by claim 3 wherein said shank is leather covered.

5. A heel as defined by claim 3 wherein said adaptor is made of metal.

6. A heel as defined by claim 3 wherein said adaptor is made of plastic.

7. A heel having a relatively large top portion and a shank formed integral therewith which terminates with a relatively narrow tread end, said shank having an elongated hole extending longitudinally thereof from said tread end toward said top portion, means at said tread end defining a counterbore for said hole, a reinforcing dowel driven into said hole, said dowel having a head, and a plastic top-lift having a body portion with a bottom walking surface and a neck portion formed integral with and projecting up from said body portion, said neck portion having a cavity enlarged at its inner end with the head of said dowel disposed therein, said neck portion inserted into said counterbore, said neck prior to insertion having an outside diameter larger than the diameter of said counterbore, said neck portion in inserted position being deformed inwardly against said dowel by radial compression exerted by said heel at the level of said counterbore, whereby said top-lift is frictionally secured to said heel.

8. A heel having a relatively large top portion and a shank formed integral therewith which terminates with a relatively narrow tread end, said shank having an elongated hole extending longitudinally thereof from said tread end toward said top portion, means at said tread end defining a counterbore for said hole, a reinforcing dowel driven into said hole, and a plastic top-lift having a body portion with a bottom walking surface and a neck portion formed integral with and projecting up from said body portion, said neck portion bevelled at its outer edge to facilitate insertion into said counterbore, said neck portion having a cavity with the bottom end of said dowel disposed therein, said neck portion inserted into said counterbore, said neck prior to insertion having an outside diameter larger than the diameter of said counterbore, said neck portion in inserted position being deformed inwardly against said dowel by radial compression exerted by said heel at the level of said counterbore, whereby said top-lift is frictionally secured to said heel.

9. A top-lift having a bottom end and a top end, said bottom end having a relatively flat walking surface, said top end having an annular shoulder and a neck portion projecting up from said shoulder, said neck portion having an outside diameter smaller than said shoulder and a cavity open at said top end for receiving the end of a reinforcing dowel, said neck portion also having a beveled edge to facilitate insertion into the heel of a shoe.

10. A top-lift as defined by claim 9 wherein said cavity extends a slight distance beyond said shoulder.

11. A top-lift as defined by claim 9 wherein said cavity extends approximately to the level of said shoulder.

12. A heel having a shank with a bottom end face and a bore extending up from said end face, said shank also having a counterbore for said bore at said end face, a reinforcing dowel fixed in said bore, said dowel having its bottom end approximately even with said end face, a top-lift comprising a bottom body portion and a top neck portion with a cavity extending substantially to the junction of said body and neck portions, said neck portion disposed in said counterbore with said dowel projecting into said cavity, said neck portion held in place and distorted from its original configuration by radial compression between said heel and said dowel.

13. A heel as defined by claim 12 wherein said neck as formed has an outside diameter larger than the diameter of said counterbore.

14. A heel as defined by claim 12 wherein said neck prior to insertion in said counterbore has a beveled edge to facilitate said insertion.

15. A top-lift as defined by claim 12 wherein said top-lift is made of a plastic material having sufficient resiliency for said neck portion to flow under radial compression.

16. A top-lift having a bottom end and a top end, said bottom end having a flat walking surface, said top end having a flat annular shoulder and a neck portion projecting up beyond said shoulder, the plane of said shoulder extending at right angles to the longitudinal axis of said neck portion, said neck portion having an outside diameter smaller than said shoulder and also having a cavity along its longitudinal axis for receiving the end of a reinforcing dowel, said shoulder being substantially concentric with said cavity, said cavity extending into said neck from the top end thereof and terminating in a substantially flat surface located approximately at the level of said shoulder and extending at right angles to said longitudinal axis.

17. A heel having a top portion and a shank formed integral therewith which terminates in a tread end, said tread end having a bottom surface, said shank having an elongated hole extending longitudinally thereof from said bottom surface toward said top portion, a counterbore for said hole at said bottom surface, a countersink for said counterbore at said bottom surface, a reinforcing dowel driven into said hole, a top-lift having a bottom end and a top end, said bottom end having a substantially flat walking surface, said top end having an annular shoulder and a neck portion projecting up from said shoulder, said neck portion having a cavity to accommodate said dowel pin and also a beveled edge to facilitate insertion into said counterbore, said neck portion disposed in said counterbore with the bottom end of said dowel disposed in said cavity and said shoulder engaging said bottom surface, said neck portion prior to insertion having an outside diameter larger than the diameter of said counterbore, said neck portion in inserted position being deformed inwardly against said dowel by radial compression exerted by said heel at the level of said counterbore, whereby said top-lift is frictionally secured to said heel.

References Cited in the file of this patent

UNITED STATES PATENTS

| | | |
|---|---|---|
| 2,495,820 | Peretti et al. | Jan. 31, 1950 |
| 2,923,072 | Goldstein | Feb. 2, 1960 |
| 3,035,358 | Ross | May 22, 1962 |